(12) United States Patent
Jang et al.

(10) Patent No.: US 12,472,529 B2
(45) Date of Patent: Nov. 18, 2025

(54) STEP-HEIGHT MEASUREMENT DEVICE AND METHOD FOR SLOT DIE

(71) Applicant: LG Energy Solution, Ltd., Seoul (KR)

(72) Inventors: Jiwoong Jang, Daejeon (KR); Sang Su Ryu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/270,330

(22) PCT Filed: Nov. 1, 2022

(86) PCT No.: PCT/KR2022/016937
§ 371 (c)(1),
(2) Date: Jun. 29, 2023

(87) PCT Pub. No.: WO2023/075572
PCT Pub. Date: May 4, 2023

(65) Prior Publication Data
US 2024/0109097 A1 Apr. 4, 2024

(30) Foreign Application Priority Data
Nov. 1, 2021 (KR) .................. 10-2021-0147971

(51) Int. Cl.
*G01B 11/14* (2006.01)
*B05C 5/02* (2006.01)

(52) U.S. Cl.
CPC ........... *B05C 5/0262* (2013.01); *G01B 11/14* (2013.01)

(58) Field of Classification Search
None
See application file for complete search history.

(56) References Cited

U.S. PATENT DOCUMENTS

| | | |
|---|---|---|
| 2002/0023584 A1 | 2/2002 | Mandai et al. |
| 2003/0157252 A1* | 8/2003 | Tokimasa ............. B05C 5/0254 427/355 |
| 2004/0197466 A1 | 10/2004 | Tokimasa et al. |
| 2004/0197480 A1 | 10/2004 | Tokimasa et al. |
| 2007/0092655 A1 | 4/2007 | Tokimasa et al. |
| 2008/0274222 A1 | 11/2008 | Cloeren |
| 2008/0274223 A1 | 11/2008 | Cloeren |

(Continued)

FOREIGN PATENT DOCUMENTS

| | | |
|---|---|---|
| CN | 212512923 U | 2/2021 |
| JP | H09248513 A | 9/1997 |

(Continued)

OTHER PUBLICATIONS

Keyence LC-2400 Datasheet (https://www.artisantg.com/Scientific/77009-2/Keyence-LC-2400A-Laser-Displacement-Meter-Controller?srsltid=AfmBOoqQdyvCTzQOVc0_fhhccJb7qLPYzkCAs_COrGAnHzuFp9AhSCa).*

(Continued)

*Primary Examiner* — Charles Capozzi
(74) *Attorney, Agent, or Firm* — Lerner David LLP

(57) ABSTRACT

An apparatus for measuring a step difference between a lip and a shim of a slot die includes: a laser sensor configured to measure a step difference between a lip and a shim of a slot die, the laser sensor being disposed to face the lip and the shim of the slot die, and a jig configured to come into contact with at least a part of the body where a portion of the slot die from which the ink is discharged is positioned. A method to implementing the same.

11 Claims, 11 Drawing Sheets

(56) References Cited

U.S. PATENT DOCUMENTS

| | | |
|---|---|---|
| 2018/0275071 A1 | 9/2018 | Choi et al. |
| 2021/0151732 A1 | 5/2021 | Ahn et al. |

FOREIGN PATENT DOCUMENTS

| | | | |
|---|---|---|---|
| JP | 2001170542 | A | 6/2001 |
| JP | 2002018340 | A | 1/2002 |
| JP | 2003245595 | A | 9/2003 |
| JP | 2003275652 | A | 9/2003 |
| JP | 2005221305 | A | 8/2005 |
| JP | 2006272270 | A | 10/2006 |
| JP | 2007212363 | A | 8/2007 |
| JP | 2021045744 | A | 3/2021 |
| JP | 2021-102177 | A | 7/2021 |
| KR | 20080097905 | A | 11/2008 |
| KR | 20150088188 | A | 7/2015 |
| KR | 101578765 | B1 | 12/2015 |
| KR | 20210061578 | A | 5/2021 |
| KR | 102301210 | B1 | 9/2021 |

OTHER PUBLICATIONS

Espacenet translation of JP2006272270.*
Extended European Search Report including Written Opinion for Application No. 22887766.8 dated Jan. 31, 2024, pp. 1-8.
International Search Report for PCT/KR2022/016937 mailed Feb. 21, 2023. 3 pgs.

* cited by examiner

[FIG. 1]
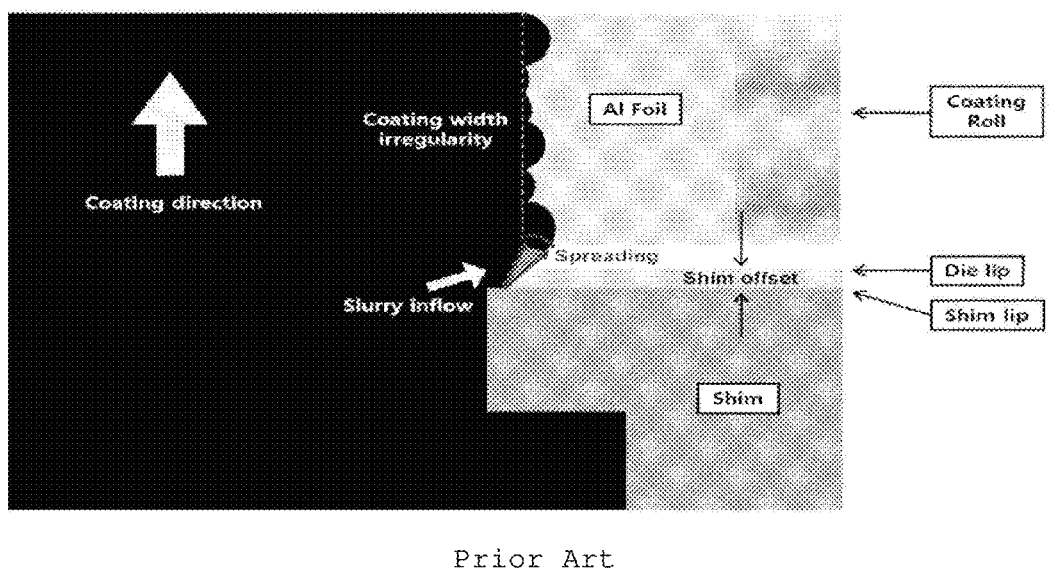
Prior Art

[FIG. 2]
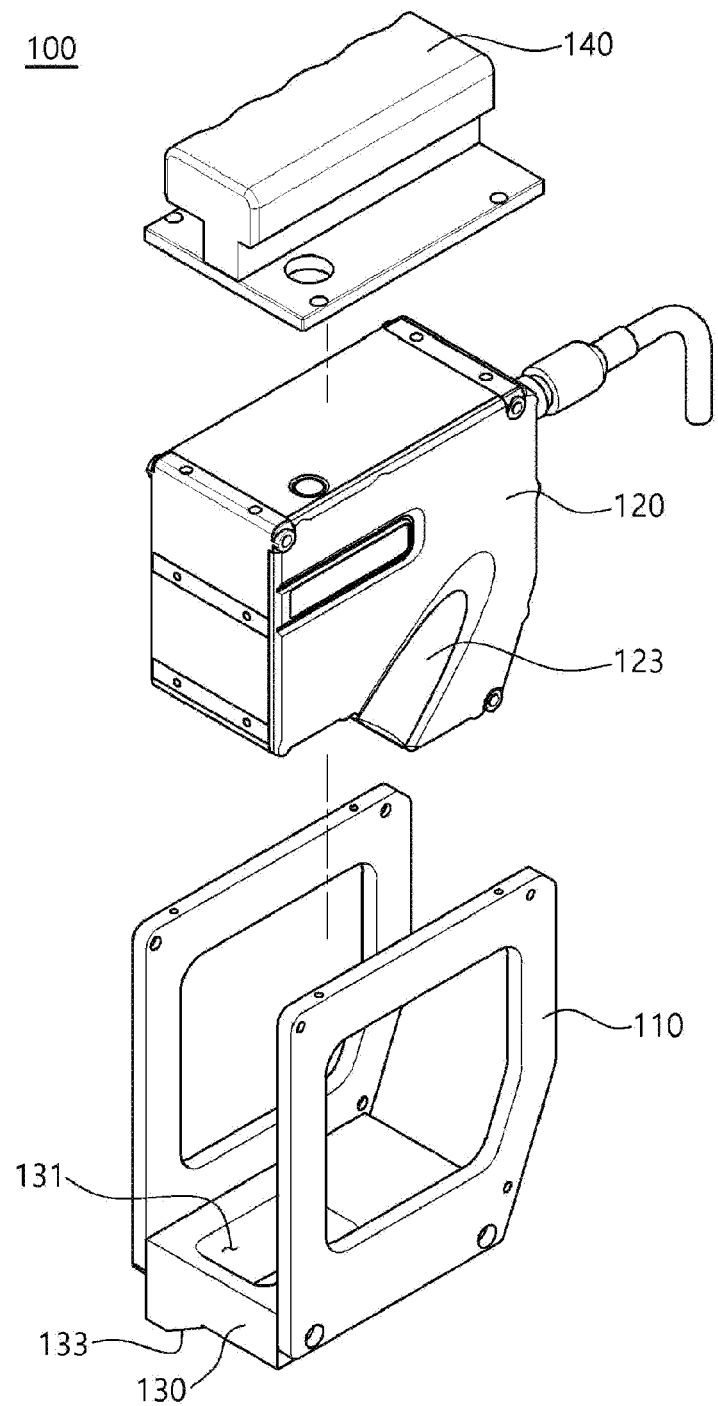

[FIG. 3]
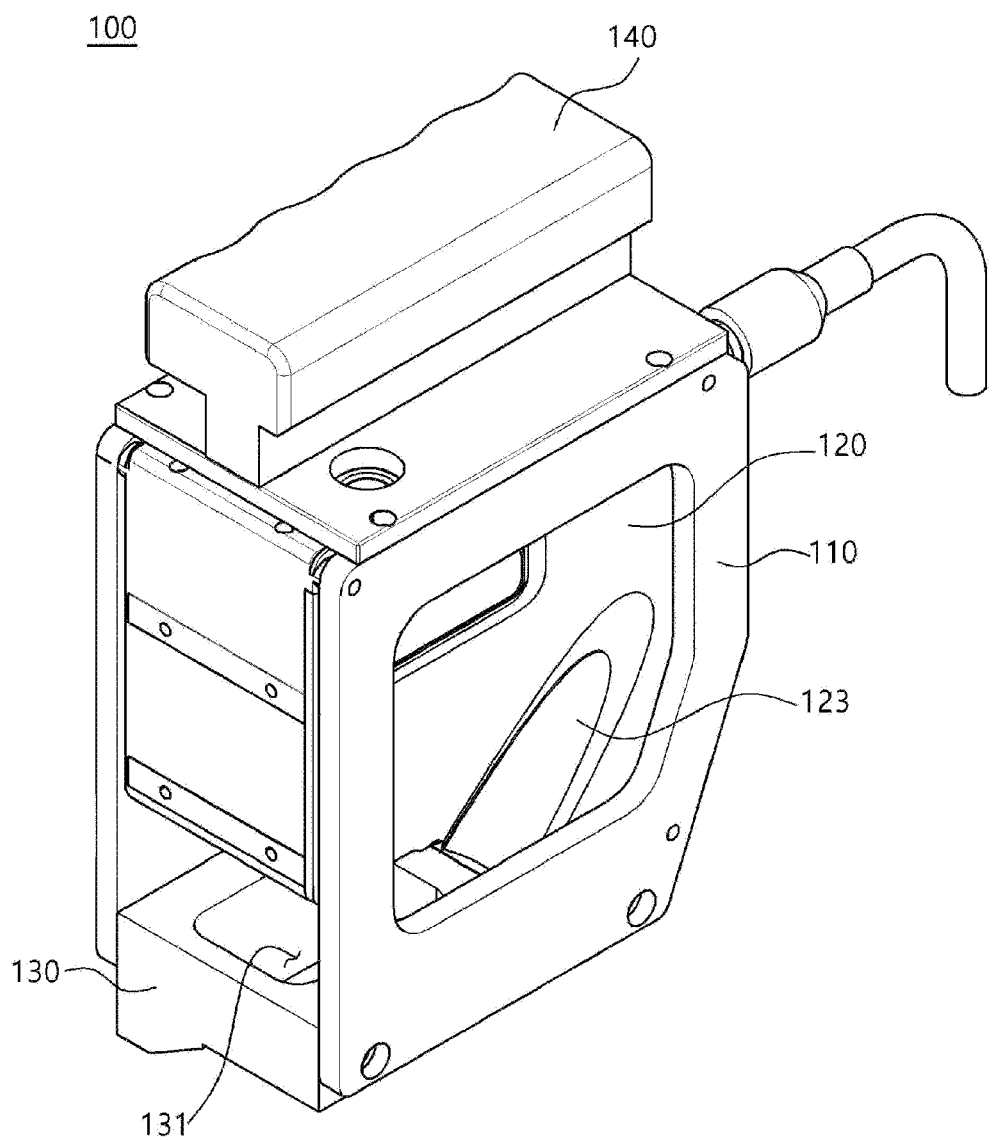

[FIG. 4]
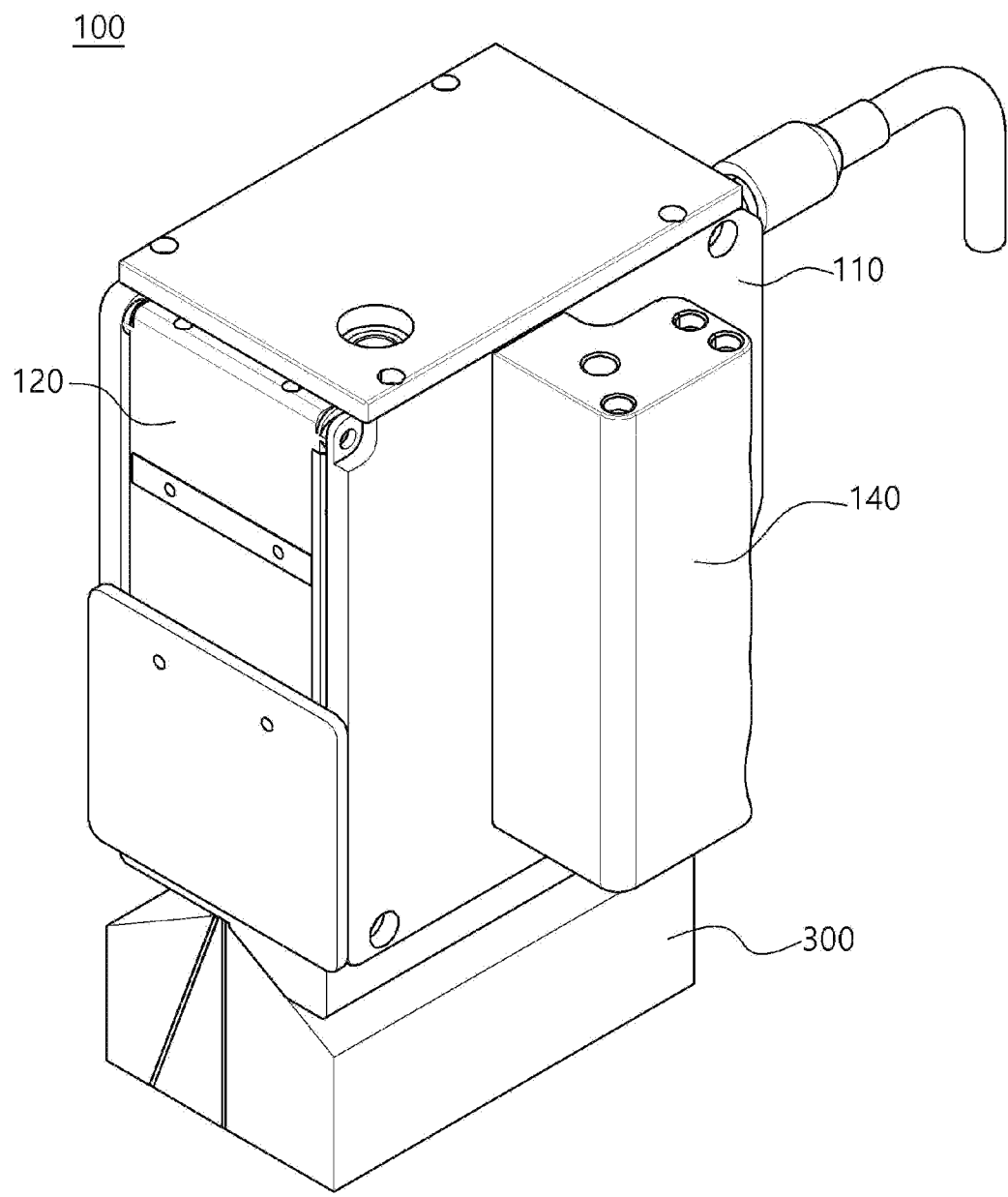

[FIG. 5]
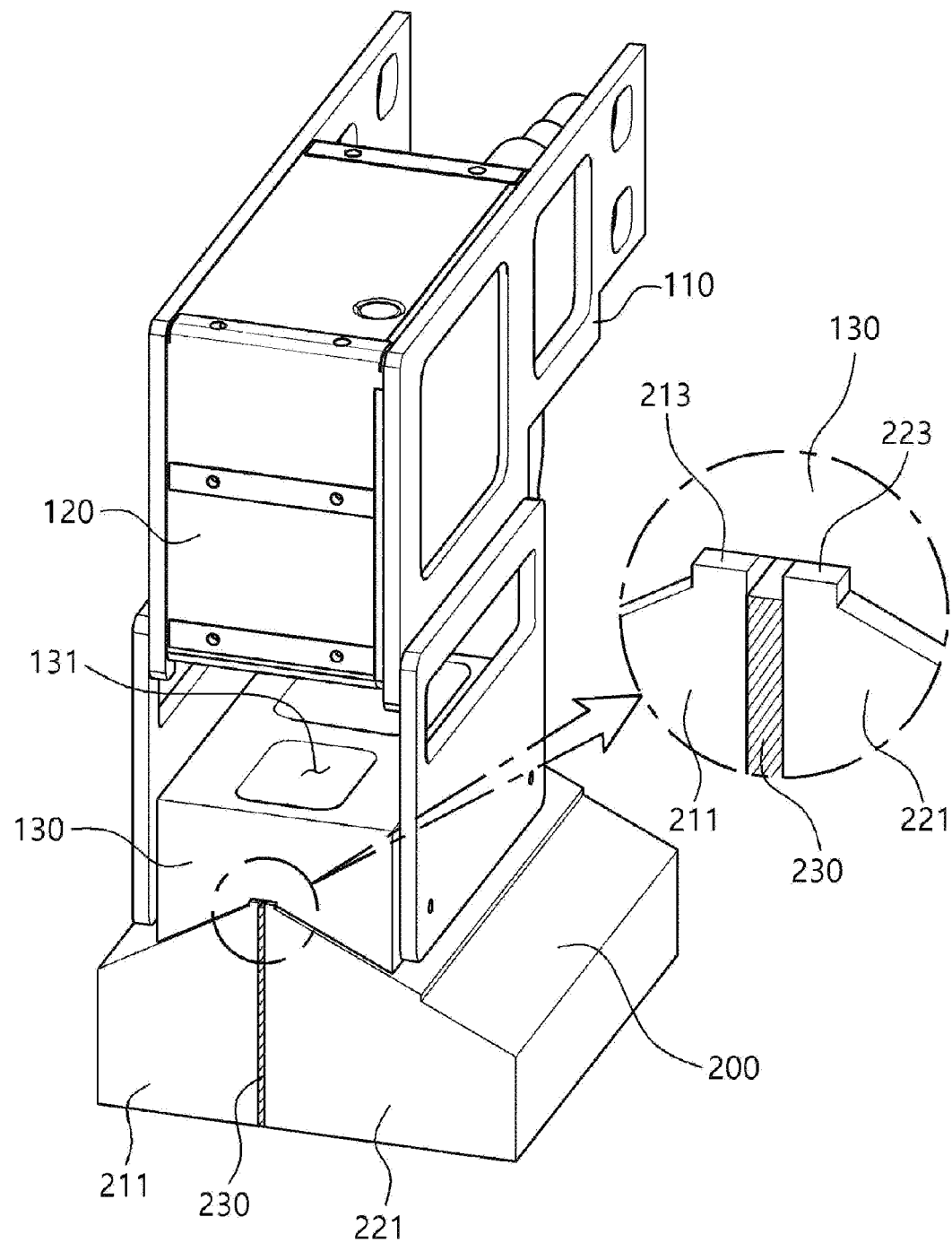

[FIG. 6]
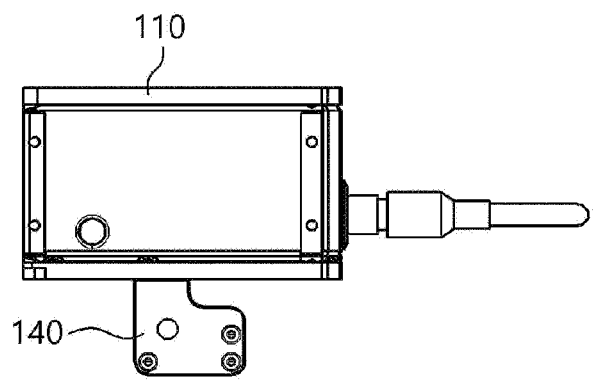
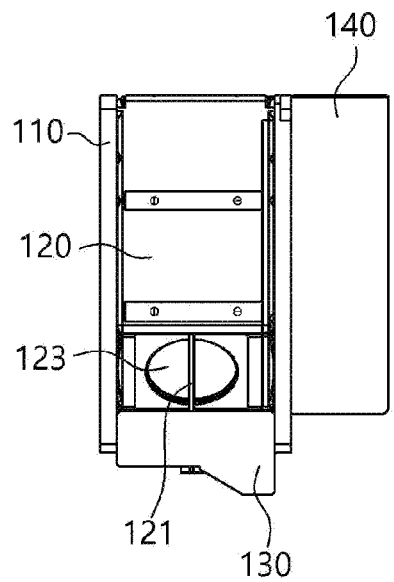
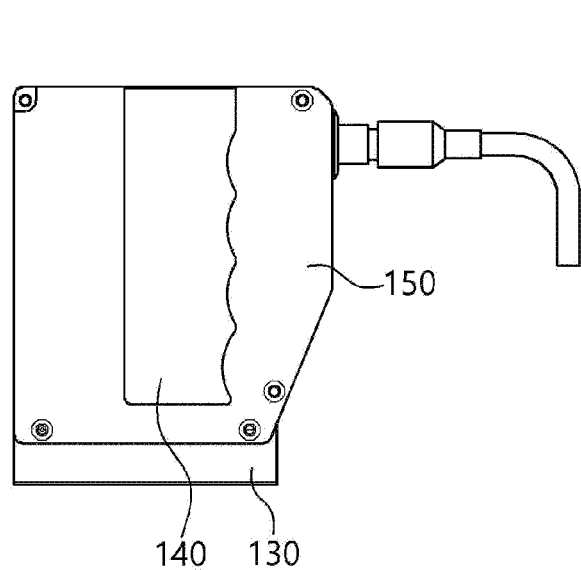

[FIG. 7]
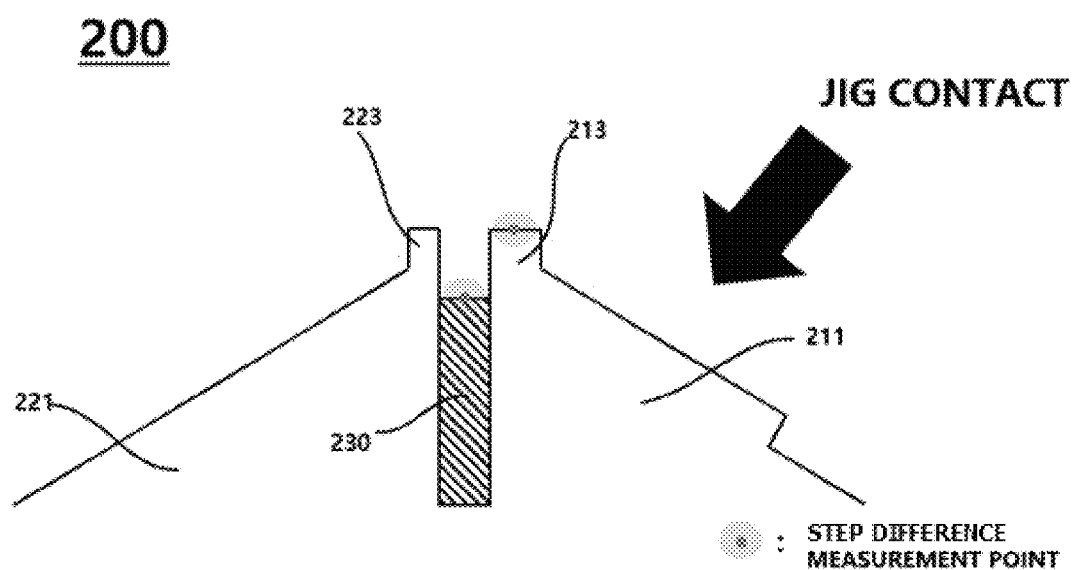

[FIG. 8]
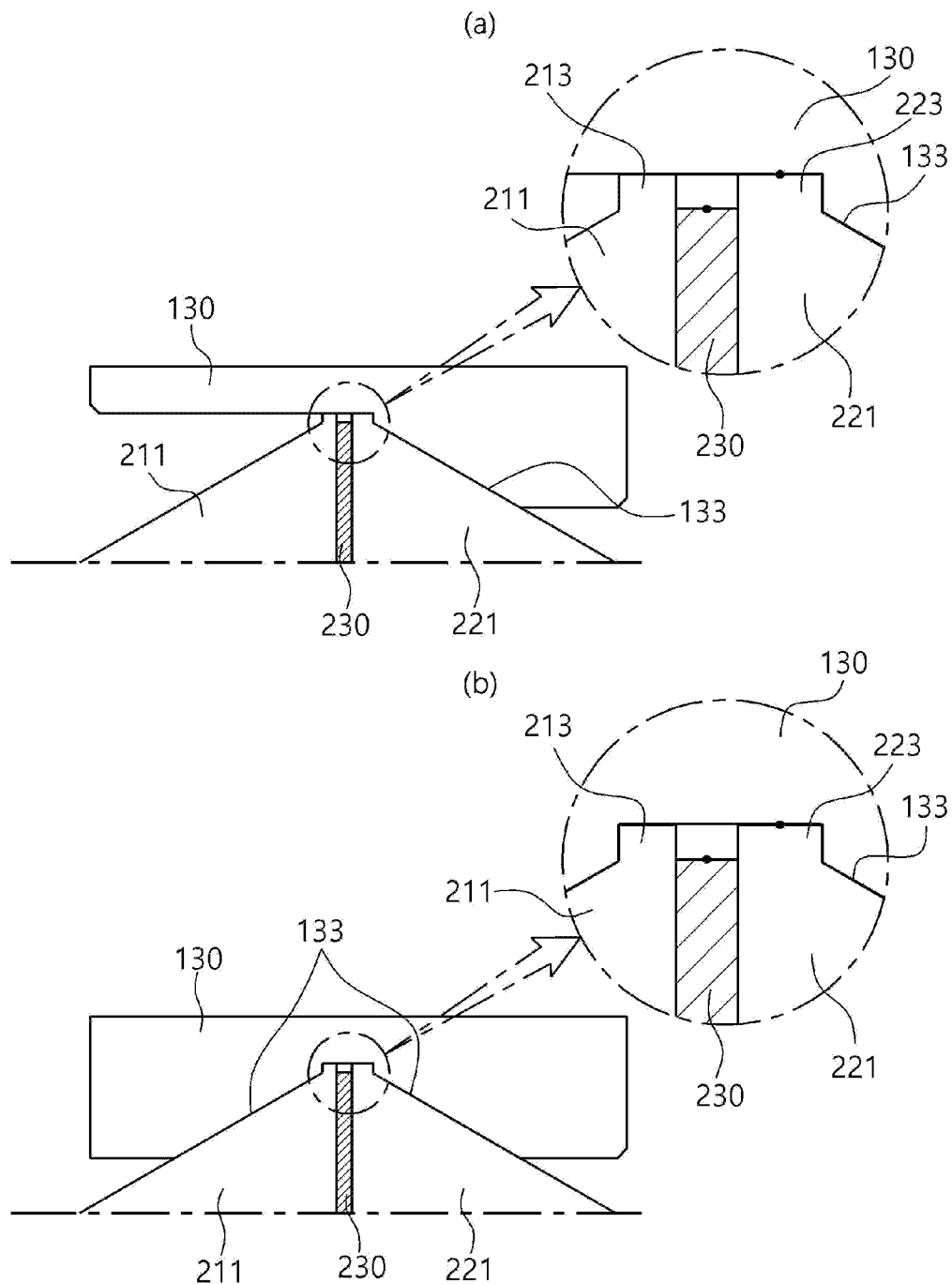

[FIG. 9]
300
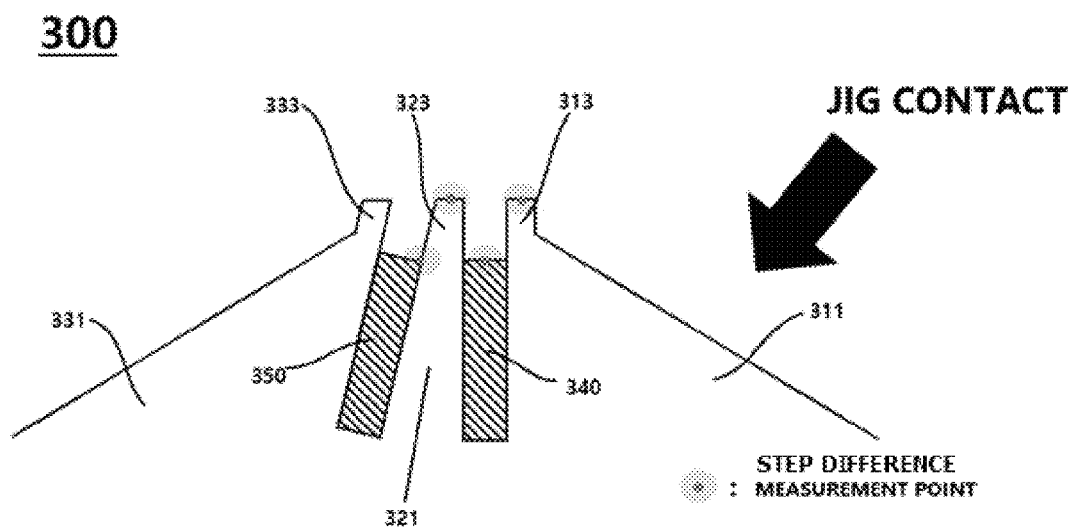

[FIG. 10]
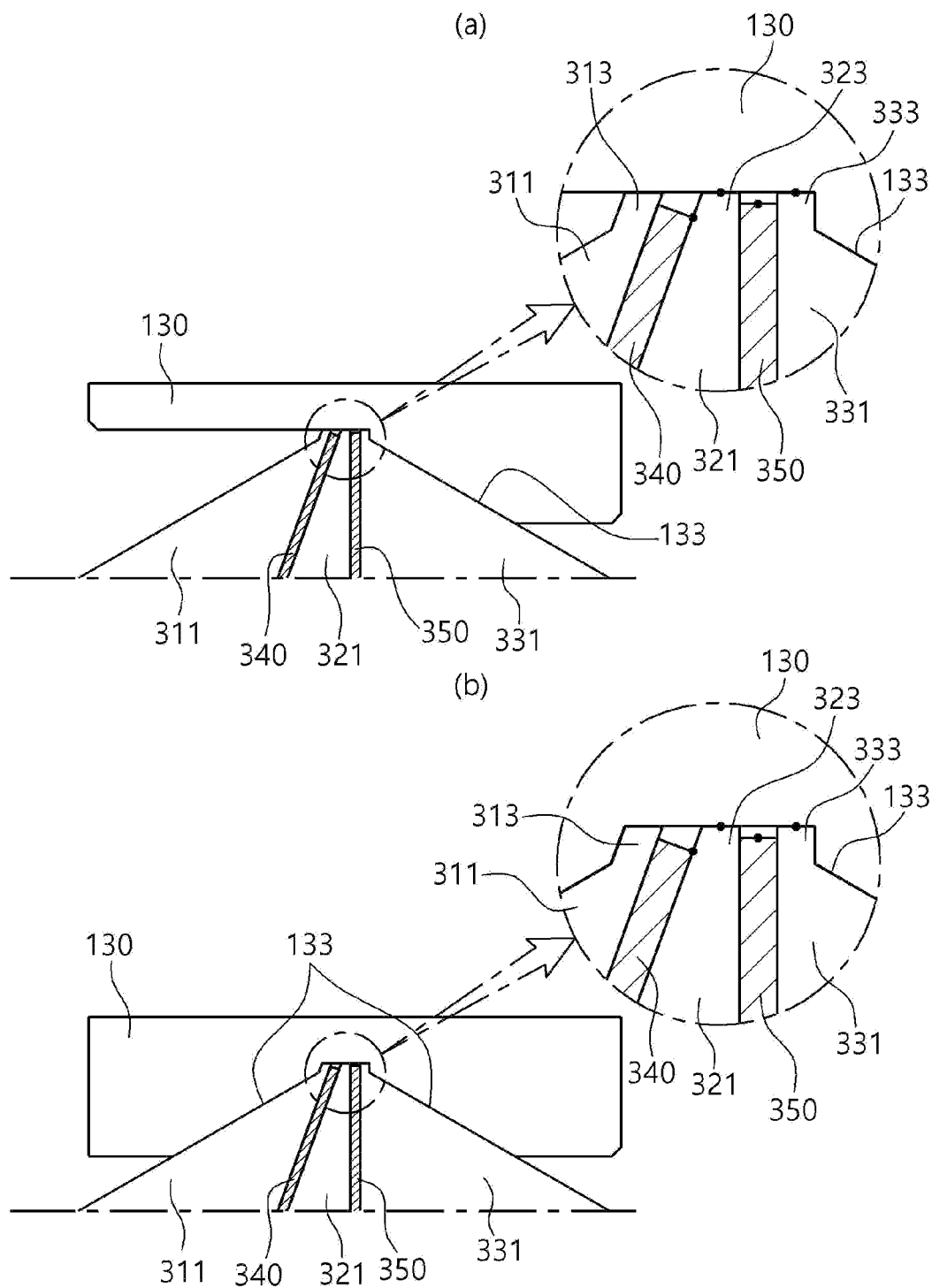

[FIG. 11]
(a)
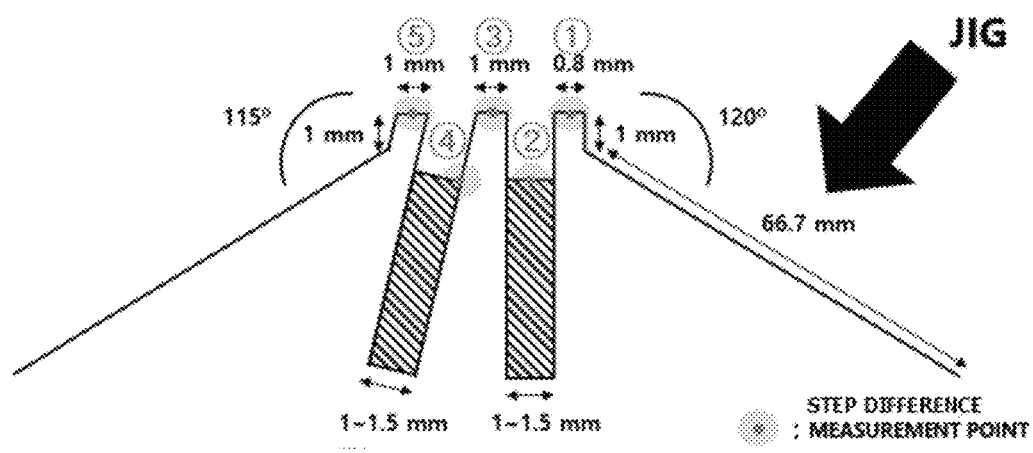
(b)
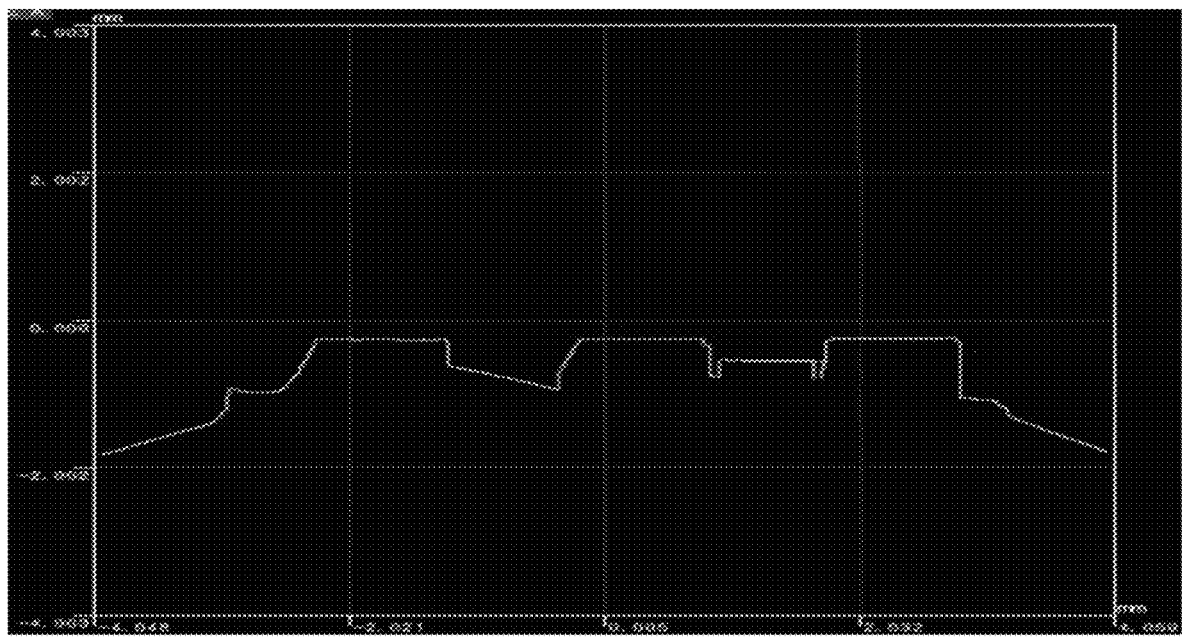

STEP-HEIGHT MEASUREMENT DEVICE AND METHOD FOR SLOT DIE

CROSS-REFERENCE TO RELATED APPLICATION

The present application is a national phase entry under 35 U.S.C. § 371 of International Application No. PCT/KR2022/016937 filed on Nov. 1, 2022 which claims the benefit of priority based on Korean Patent Application No. 10-2021-0147971 filed on Nov. 1, 2021, all contents of which are incorporated herein by reference.

TECHNICAL FIELD

The present specification relates to an apparatus and method for measuring a step difference between a lip and a shim of a slot die.

BACKGROUND ART

Recently, prices of energy sources have been raised because of the depletion of fossil fuels, and the interest in environmental pollution is increasing. Therefore, there is an increasing demand for environmental-friendly alternative energy sources. Therefore, research on various power production technologies such as nuclear power, solar power, wind power, and tidal power is continuously being conducted. In addition, interest in power storage devices for more efficiently using the produced energy is high.

In particular, as the development of technologies and demands for mobile devices are increased, there is a rapidly increasing demand for batteries as energy sources. Many studies are being conducted on the batteries in order to meet these needs.

Representatively, regarding a shape of the battery, there is a high demand for an angular or pouch-type secondary battery that may have a small thickness and be applied to products such as mobile phones. Regarding a material, there is a high demand for lithium secondary batteries such as lithium-ion batteries or lithium-ion polymer batteries that have advantages such as a high energy density, a discharge voltage, and output stability.

In general, the secondary battery is structured to include an electrode assembly made by stacking a positive electrode, a negative electrode, and a separator positioned between the positive electrode and the negative electrode. The positive and negative electrodes are each manufactured by applying slurry containing an active material onto a current collector.

The current collector needs to be coated with the slurry having a uniform thickness to uniformize characteristics of the secondary batteries. To this end, a slurry coating apparatus such as a die coater is used. The slurry coating apparatus includes a slot die for thinly applying the slurry over a wide area.

The coating method using the slot die is better in terms of maintenance and productivity than other coating methods. Therefore, the coating method using the slot die is widely and presently used for a process of manufacturing a panel for a flat panel display device as well as the process of applying slurry onto the current collector of the secondary battery electrode.

Like a fountain pen in which ink is discharged through a nib, the slot die discharges slurry through a tip thereof for discharging ink, such that the slurry is applied onto the current collector while the slot die itself moves or the current collector is moved.

There is a step difference (shim offset or gap) between a lip and a shim at two opposite ends of the slot die based on a width direction of the current collector. The ink is spread by surface tension in the step difference during the coating process using the slot die.

In this case, when the step difference between the lip and the shim is a predetermined level or lower, the spread occurs uniformly, and thus a deviation of a width of the applied slurry is small. However, in case that the step difference between the lip and the shim deviates from the predetermined level as illustrated in FIG. 1, the deviation of the width of the applied slurry increases.

Accordingly, the management needs to be performed to prevent the step difference between the lip and the shim from deviating from the predetermined level. To this end, it is necessary to devise a method capable of measuring the step difference between the lip and the shim.

DETAILED DESCRIPTION OF THE INVENTION

Technical Problem

The present specification provides an apparatus and method for measuring a step difference between a lip and a shim of a slot die.

Technical Solution

An embodiment of the present specification provides an apparatus for measuring a step difference of a slot die, the apparatus including: a laser sensor configured to measure a step difference between a lip and a shim of a slot die including two or more bodies having the lips provided at one end thereof, and the shim provided between the two or more lips and configured to discharge ink, the laser sensor being disposed to face the lip and the shim of the slot die; and a jig configured to come into contact with at least a part of the body where a portion of the slot die from which the ink is discharged is positioned.

Another embodiment of the present specification provides a method of measuring a step difference of a slot die, which includes two or more bodies having lips provided at one end thereof, and a shim provided between the two or more lips and configured to discharge ink, the method including: bringing a jig of the apparatus, which has a laser sensor, into contact with at least a part of an upper end of the body where a portion of the slot die from which the ink is discharged is positioned; and measuring, by the laser sensor, a step difference between the lip and the shim of the slot die.

Advantageous Effects

The apparatus for measuring a step difference of a slot die according to the embodiment of the present specification may measure the step difference between the lip and the shim.

The apparatus for measuring a step difference of a slot die according to another embodiment of the present specification may determine the measured step difference between the lip and the shim, which makes it possible to manage the step difference at the appropriate level.

The apparatus for measuring a step difference of a slot die according to still another embodiment of the present specification has high portability. Therefore, the apparatus may measure the step difference between the lip and the shim after performing ink coating, which makes it possible to often check a change in step difference according to the process.

The apparatus for measuring a step difference of a slot die according to yet another embodiment of the present specification may check a change of the step difference according to the ink coating process and adjust the step difference between the lip and the shim when the change of the step difference is severe.

BRIEF DESCRIPTION OF DRAWINGS

FIG. 1 is a view illustrating a problem of non-uniformity of a coating interface that occurs when a step difference between a lip and a shim of a slot die is large.

FIG. 2 is an exploded perspective view of an apparatus for measuring a step difference according to the embodiment.

FIG. 3 is a coupled perspective view of the apparatus for measuring a step difference according to the embodiment.

FIG. 4 is a coupled cross-sectional view of an apparatus for measuring a step difference according to another embodiment.

FIG. 5 is a perspective view illustrating a state in which an apparatus for measuring a step difference according to another embodiment is in contact with a slot die.

FIG. 6A is a top plan view of an apparatus for measuring a step difference according to still another embodiment, FIG. 6B is a front view of the apparatus for measuring a step difference according to still another embodiment, and FIG. 6C is a side view of the apparatus for measuring a step difference according to still another embodiment.

FIG. 7 is a cross-sectional view of an ink discharge tip of a single die.

FIG. 8A is a side view illustrating a state in which the apparatus for measuring a step difference of a slot die according to the embodiment of the present specification is in contact with the single die, and FIG. 8B is a side view illustrating a state in which the apparatus for measuring a step difference of a slot die according to still another embodiment of the present specification is in contact with the single die.

FIG. 9 is a cross-sectional view of an ink discharge tip of a double die.

FIG. 10A is a side view illustrating a state in which the apparatus for measuring a step difference of a slot die according to the embodiment of the present specification is in contact with the double die, and FIG. 10B is a side view illustrating a state in which the apparatus for measuring a step difference of a slot die according to still another embodiment of the present specification is in contact with the double die.

FIG. 11A is a cross-sectional view of an experimental slot die manufactured according to the embodiment, and FIG. 11B is an image of a slot die made by laser sensing of the apparatus for measuring a step difference.

EXPLANATION OF REFERENCE NUMERALS AND SYMBOLS

100: Apparatus for measuring step difference
110: Body part
120: Laser sensor
123: Detector
130: Jig
131: Through-hole
133: Contact portion
140: Handle
200: Single die
211: First body
213: First lip
221: Second body
223: Second lip
230: Shim
300: Double die
311: First body
313: First lip
321: Second body
323: Second lip
331: Third body
333: Third lip
340: First shim
350: Second shim

DETAILED DESCRIPTION

Hereinafter, the present disclosure will be described in detail with reference to the drawings. However, the drawings are intended to illustratively describe the present disclosure, and the scope of the present disclosure is not limited by the drawings.

FIG. 2 is an exploded perspective view of an apparatus for measuring a step difference according to the embodiment, and FIG. 3 is a coupled perspective view of the apparatus for measuring a step difference according to the embodiment.

FIG. 4 is a coupled cross-sectional view of an apparatus for measuring a step difference according to another embodiment, FIG. 6A is a top plan view of an apparatus for measuring a step difference according to still another embodiment, FIG. 6B is a front view of the apparatus for measuring a step difference according to still another embodiment, and FIG. 6C is a side view of the apparatus for measuring a step difference according to still another embodiment.

An apparatus 100 for measuring a step difference of a slot die includes a laser sensor 120 and a jig 130. In this case, the laser sensor 120 and the jig 130 are spaced apart from each other. A body part 110 may be further provided and accommodate the laser sensor 120 and the jig 130. The laser sensor 120 and the jig 130 are fixedly coupled to the body part 110, but the coupling method is not particularly limited. The body part 110 is not particularly limited as long as the body part 110 may fix the laser sensor 120 and the jig 130. The body part 110 may include two or more plates, and a cross-section of the body part 110 may have a 'ㄷ' shape or a 'ㅁ' shape.

FIG. 5 is a perspective view illustrating a state in which an apparatus for measuring a step difference according to another embodiment is in contact with a slot die.

The laser sensor 120 is provided to face the ends of an ink-discharge-tip-side lip and a shim of a slot die that is a measurement target. Specifically, the laser sensor 120 is provided to face the ends of the lip and the shim of the slot die including two or more bodies 211 and 221 having lips 213 and 223 provided at one end thereof, and a shim 230 provided between the two or more bodies so that ink is discharged.

The laser sensor 120 may emit laser beams to the ends of the lip and the shim of the slot die, detect the laser beams reflected by surfaces of the lip and the shim of the slot die, and derive a shape of the gap.

The laser sensor 120 may include a laser emitter (not illustrated) configured to emit laser beams to the ends of the lip and the shim of the slot die, and a detector 123 configured to detect the laser beams reflected by the surfaces of the lip and the shim of the slot die.

The laser emitter (not illustrated) of the laser sensor 120 is provided to allow the laser beam emitted from a light source to reach the measurement target. In this case, the laser beam is light having high straightness, and the measurement target is positioned in a direction in which the laser beam is emitted.

The laser beam emitted from the laser sensor 120 is not particularly limited as long as the laser beam is reflected well by the surface, to which the laser beam is emitted, without affecting the material or shape of the ink discharge tip of the slot die. For example, the laser beam may be a visible laser beam of 380 nm to 800 nm. Specifically, the laser beam may be a blue laser beam, more specifically, it may be a laser beam of 405 nm.

The detector 123 of the laser sensor 120 may be a plate-shaped sensor capable of detecting the laser beam reflected by the surfaces of the lip and the shim of the slot die. To allow the reflected laser beam to reach the detector, an angle at which the plate-shaped sensor of the detector 123 is provided may be adjusted and determined in consideration of an emission angle of the laser beam and the shapes of the lip and the shim.

The laser sensor 120 may include an output part (not illustrated) that derives shapes of the ink-discharge-tip-side lip and the shim of the slot die on the basis of information detected by the detector 123. The shape derived by the output part is a vertical cross-section in a direction perpendicular to the width direction of an ink-discharge-tip-side end. For example, the shape similar to shapes illustrated in FIGS. 7 and 9 is derived. Based on such a shape, a height difference between designated points through coordinates of a step difference measurement point, that is, a step difference may be derived.

The jig 130 is configured to come into contact with at least a part of the body where a portion of the slot die from which the ink is discharged is positioned. The jig 130 comes into contact with and supports at least a part of the body to maintain the measurement position and a distance between the laser sensor 120 and the measurement target so that the laser sensor 120 may measure the step difference between the lip and the shim.

A distance between the lip and the laser sensor may be 17 mm or more and 23 mm or less, or 17.8 mm or more and 22.2 mm or less, i.e., 20±2.2 mm. The laser sensor senses the step difference while maintaining a predetermined interval between the laser sensor and the measurement target. The laser sensor cannot sense the step difference in the case that the predetermined interval deviates from a predetermined distance.

An area in which the jig 130 is in contact with the body is not particularly limited as long as the apparatus 100 for measuring a step difference may be stably positioned. The stability may increase as the contact area increases. Therefore, the contact area may be designed to be a maximally large contact area in consideration of an overall size of the apparatus for measuring a step difference.

As illustrated in FIGS. 8A and 10A, the jig 130 may have a shape made by cutting a '⌐'-shaped cross-section along a gradient of an inclined surface of the body. In case that the step difference measurement target is a single die, the jig 130 may come into contact with an upper surface of the first or second body 211 or 221 of the single die. In case that the step difference measurement target is a double die, the jig 130 may come into contact with an upper surface of a first or third body 311 or 331 of the double die.

As illustrated in FIGS. 8B and 10B, the jig 130 may have a shape made by cutting a '⊏'-shaped cross-section along a gradient of the inclined surface of the body. In case that the step difference measurement target is the single die, the jig 130 may come into contact with the upper surfaces of the first and second bodies 211 and 221 of the single die. In case that the step difference measurement target is the double die, the jig 130 may come into contact with the upper surfaces of the first and third bodies 311 and 331 of the double die.

Referring to FIGS. 7 and 9, the surface of the body, where the portion from which the ink is discharged is positioned, is an inclined surface having an inclination while defining a predetermined angle with respect to a lateral surface of the lip in consideration of the surface indicated by the arrow indicating the portion with which the jig is in contact as illustrated in FIGS. 7 and 9. Therefore, to increase the contact area with the jig, a contact portion 133 of the jig may also have an inclination angle identical or similar to the inclination angle of the inclined surface.

Because the jig 130 is a part that comes into contact with the body and the lip of the slot die, the jig 130 is made of a material selected from materials that do not scratch the body and the lip of the slot die with which the jig 130 is in contact. For example, the material of the jig may contain, but not limited to, acetal.

The jig 130 of the apparatus 100 for measuring a step difference is disposed to be closer to the slot die than the laser sensor 120 so that the jig 130 comes into contact with the body of the slot die. Therefore, the jig 130 has at least one through-hole 131 so that the laser beam emitted from the laser sensor 120 may reach the ink discharge tip of the slot die, and the reflected laser beam may reach the detector.

The through-hole 131 may be a single hole through which the laser beam may reach the ink discharge tip of the slot die, and the reflected laser beam may reach the detector.

The through-hole 131 may include a first hole through which the laser beam reaches the ink discharge tip of the slot die, and a second hole through which the reflected laser beam reaches the detector.

The apparatus for measuring a step difference of a slot die according to the embodiment of the present specification further includes a determination part (not illustrated).

The determination part compares the step difference between the lip and the shim, which is measured by the laser sensor, with a reference value. In case that the step difference between the lip and the shim, which is measured by the laser sensor, exceeds the reference value, the determination part determines to reassemble the slot die. The reference value is an important factor used to determine the amount of coating, the coating pattern, and the like step difference. In case that the step difference increases to a value equal to or larger than an allowable value, the slot die may be reassembled or adjusted so that the step difference is maintained within the reference value.

The reference value may be 300 μm. In case that the step difference between the lip and the shim is equal to or smaller than 300 μm, the spread of the ink caused by the step difference is constant, and a deviation of a width of the applied slurry is maintained at a predetermined level.

FIG. 7 is a cross-sectional view of the ink discharge tip of the single die.

The slot die may be a single die 200. The slot die, which is the single die 200, includes the first body 211 having the first lip 213, the second body 221 having the second lip 223, and the shim 230 provided between the first body 211 and the second body 221.

The laser sensor 120 may measure the step difference between the end of the first lip 213 and the end of the shim 230. The determination part may compare the step difference between the end of the first lip 213 and the end of the shim 230, which is measured by the laser sensor, with the reference value. In this case, the reference value may be a step difference targeted at the time of assembling the single die 200. For example, the reference value may be 300 µm.

In addition, the laser sensor 120 may further measure a step difference between the end of the first lip 213 and the end of the second lip 223.

FIG. 8A is a side view illustrating a state in which the apparatus for measuring a step difference of a slot die according to the embodiment of the present specification is in contact with the single die, and FIG. 8B is a side view illustrating a state in which the apparatus for measuring a step difference of a slot die according to still another embodiment of the present specification is in contact with the single die. As illustrated in FIGS. 8A and 8B, the shape in which the jig 130 comes into contact with the single die may vary depending on the shape of the jig 130.

FIG. 9 is a cross-sectional view of an ink discharge tip of a double die.

The slot die may be a double die 300. The slot die, which is the double die 300, includes the first body 311 having the first lip 313, the second body 321 having the second lip 323, the third body 331 having the third lip 333, a first shim 340 provided between the first body 311 and the second body 321, and a second shim 350 provided between the second body 321 and the third body 331.

The laser sensor 120 may measure a step difference between the end of the first lip 313 and the end of the first shim 340 and a step difference between the end of the second lip 323 and the end of the second shim 350. The determination part may compare at least one of the step difference between the end of the first lip 313 and the end of the first shim 340 and the step difference between the end of the second lip 323 and the end of the second shim 350, which are measured by the laser sensor, with the reference value. In this case, the reference value may be a step difference targeted at the time of assembling the double die 300. For example, the reference value related to the step difference between the end of the first lip 313 and the end of the first shim 340 may be 300 µm.

In addition, the laser sensor 120 may further measure a step difference between the end of the first lip 313 and the end of the second lip 323 and a step difference between the end of the second lip 323 and the end of the third lip 333.

FIG. 10A is a side view illustrating a state in which the apparatus for measuring a step difference of a slot die according to the embodiment of the present specification is in contact with the double die, and FIG. 10B is a side view illustrating a state in which the apparatus for measuring a step difference of a slot die according to still another embodiment of the present specification is in contact with the double die. As illustrated in FIGS. 10A and 10B, the shape in which the jig 130 comes into contact with the single die may vary depending on the shape of the jig 130.

The apparatus 100 for measuring a step difference of a slot die according to the embodiment of the present specification may further include a handle 140.

The apparatus 100 for measuring a step difference is a portable apparatus that may be easily carried, moved, and stored by a measurer. Because it is difficult to disassemble and reassemble the slot die once the slot die is installed on the coating apparatus by stacking the bodies and the shim, it is advantageous for the apparatus for measuring the step difference of the slot die to have high portability.

The handle may be designed such that the measurer may easily carry the apparatus, and the measurer holds the handle by hand while bringing the jig into contact with the slot die at the time of measuring the step difference.

The apparatus 100 for measuring a step difference may further include a controller (not illustrated) configured to control the laser sensor 120. As necessary, the components in the apparatus 100 for measuring a step difference, i.e., the components required to supply power, perform control, and output data are connected to one another by electric wires. In addition, the apparatus 100 for measuring a step difference may be simply disassembled, connected, and installed to provide portability. The components of the apparatus 100 may be stored in a portable casing after the apparatus 100 is disassembled.

Still another embodiment of the present specification provides a method of measuring a step difference of a slot die, which includes two or more bodies having lips provided at one end thereof, and a shim provided between the two or more lips and configured to discharge ink, the method including: bringing a jig of the apparatus for measuring a step difference, which has a laser sensor, into contact with at least a part of an upper end of the body where a portion of the slot die from which the ink is discharged is positioned; and measuring, by the laser sensor, a step difference between the lip and the shim of the slot die.

In this case, to prevent the repeated description, the description of the method of measuring a step difference of a slot die may be replaced with the description of the apparatus for measuring a step difference.

The method of measuring a step difference of a slot die may further include comparing the step difference between the lip and the shim, which is measured by the laser sensor, with a reference value.

The method of measuring a step difference of a slot die may further include reassembling the slot die when the step difference between the lip and the shim, which is measured by the laser sensor, exceeds the reference value. In this case, the reference value may be 300 µm.

MODE FOR INVENTION

Hereinafter, the present specification will be described in more detail with reference to examples. However, the flowing examples are intended to illustratively describe the present specification, and the scope of the present specification is not limited by the flowing examples.

EXAMPLES

An experimental slot die as illustrated in FIG. 11A was manufactured, and a step difference offset was measured by the apparatus for measuring a step difference. The step difference was measured ten times under the conditions set in Table 1, and the evaluation of errors of measured data was collected. In this case, the "measurer readjustment measurement reproducibility" means reproducibility of data when the measurer is separated from the slot die after the measurement and adjusted in measurement position, and then the measurement is performed. The "sensor continuous measurement repeatability" means repeatability of measured data continuously measured without separating the measurer from the slot die after the measurement.

A master (verification) specimen was a master (verification) specimen of Mitutoyo to which a step difference level was arbitrarily preset. How accurately the data value is measured by the apparatus for measuring a step difference according to the present specification was identified. Master (verification) specimens having step differences of 50 µm, 100 µm, and 300 µm were used. In this case, the step differences were selected at levels at which the step difference needed to be adjusted to the step difference between the lip and the shim of the die.

FIG. 11B. The step difference measurement points were designated on the above-mentioned image, and then the offset values were derived.

TABLE 1

| Data | Classification | | |
|---|---|---|---|
| | Measurer readjustment measurement reproducibility | | Sensor continuous measurement repeatability |
| | Measurement of experimental die | Measurement of verification specimen | Measurement of mini-die |
| Measurement direction | Readjustment of measurer → repeated measurement of specimen | | After fixing of sensor to specimen → repeated measurement of only sensor |
| Number of data | 10ea | 10ea | 10ea |
| Remarks | | Measurement of verification specimen for each thickness(50/100/300 um) | |

In this case, the apparatus for measuring a step difference used lasers with the following conditions.

Reference distance (Z-axis): 20±2.2 mm (repetition degree of 0.3 μm)

Measuring range (X-axis): 7.5 mm (repetition degree of 0.3 μm)

Data interval: 2.5 μm

Light source: blue LED (blue semiconductor laser)

Wavelength: 405 nm visible ray

Output: 10 mV

A result of measuring the step difference of the experimental die each time the readjustment of the measurement position of the measurer, i.e., the apparatus for measuring a step difference was performed according to the scheme in Table 1, is shown in Table 2 below.

TABLE 2

| | No | | | |
|---|---|---|---|---|
| Item | Out 1 Bottom Shim offset (mm) | Out 2 Bottom Die Offset (mm) | Out 3 Top Shim Offset (mm) | Out 4 Top Die Offset (mm) |
| 1 | 0.295 | 0.013 | 0.691 | 0.008 |
| 2 | 0.293 | 0.008 | 0.675 | 0.008 |
| 3 | 0.291 | 0.011 | 0.654 | 0.004 |
| 4 | 0.294 | 0.013 | 0.653 | 0.005 |
| 5 | 0.293 | 0.011 | 0.663 | 0.003 |
| 6 | 0.292 | 0.01 | 0.668 | 0.005 |
| 7 | 0.291 | 0.01 | 0.66 | 0.004 |
| 8 | 0.292 | 0.01 | 0.657 | 0.003 |
| 9 | 0.295 | 0.011 | 0.677 | 0.005 |
| 10 | 0.291 | 0.008 | 0.656 | 0.001 |
| Average | 0.293 | 0.011 | 0.665 | 0.005 |
| Standard deviation | 0.002 | 0.002 | 0.012 | 0.002 |

Based on FIG. 11A, a bottom shim offset is a step difference of ①-②, a bottom die offset is a step difference of ①-③, a top shim offset is a step difference of ③-④, and a top die offset is a step difference of ③-⑤. In this case, ① to ⑤ mean positions respectively corresponding to the step difference measurement points indicated by the points illustrated in FIG. 11A.

An image of the slot die made by laser sensing of the apparatus for measuring a step difference is illustrated in A result of measuring the thickness of the verification specimen each time the readjustment of the measurement positions of the measurer, i.e., the apparatus for measuring a step difference, and the verification specimen was performed according to the scheme in Table 1 is shown in Table 3 below.

TABLE 3

| | Target thickness of verification specimen | | |
|---|---|---|---|
| | 50 um | 100 um | 300 um |
| Item | Actually measured thickness (mm) | Actually measured thickness (mm) | Actually measured thickness (mm) |
| 1 | 0.051 | 0.102 | 0.300 |
| 2 | 0.051 | 0.102 | 0.300 |
| 3 | 0.051 | 0.102 | 0.300 |
| 4 | 0.05 | 0.102 | 0.300 |
| 5 | 0.051 | 0.102 | 0.300 |
| 6 | 0.05 | 0.103 | 0.300 |
| 7 | 0.05 | 0.102 | 0.300 |
| 8 | 0.05 | 0.102 | 0.300 |
| 9 | 0.05 | 0.102 | 0.300 |
| 10 | 0.05 | 0.102 | 0.300 |
| Average | 0.050 | 0.102 | 0.300 |
| Standard deviation | 0.001 | 0.000 | 0.000 |

A result of fixing the measurer and continuously sensing the step difference of the experimental die according to the scheme in Table 1 is shown in Table 4 below.

TABLE 4

| | No | | | |
|---|---|---|---|---|
| Item | Out 1 Bottom Shim offset (mm) | Out 2 Bottom Die Offset (mm) | Out 3 Top Shim Offset (mm) | Out 4 Top Die Offset (mm) |
| 1 | 0.295 | 0.01 | 0.645 | 0.006 |
| 2 | 0.295 | 0.01 | 0.645 | 0.006 |
| 3 | 0.295 | 0.01 | 0.641 | 0.006 |
| 4 | 0.295 | 0.01 | 0.641 | 0.006 |
| 5 | 0.295 | 0.01 | 0.643 | 0.006 |
| 6 | 0.295 | 0.01 | 0.643 | 0.006 |
| 7 | 0.295 | 0.01 | 0.643 | 0.006 |
| 8 | 0.295 | 0.01 | 0.643 | 0.006 |
| 9 | 0.295 | 0.01 | 0.643 | 0.006 |

TABLE 4-continued

| | No | | | |
|---|---|---|---|---|
| Item | Out 1 Bottom Shim offset (mm) | Out 2 Bottom Die Offset (mm) | Out 3 Top Shim Offset (mm) | Out 4 Top Die Offset (mm) |
| 10 | 0.295 | 0.009 | 0.645 | 0.006 |
| Average | 0.295 | 0.010 | 0.643 | 0.006 |
| Standard deviation | 0.000 | 0.000 | 0.001 | 0.000 |

A result of measuring the step difference of the experimental die according to the scheme in Table 1 is shown in Table 5, and a result of measuring a target thickness and an actually measured thickness of the verification specimen is shown in Table 6.

TABLE 5

| | | Classification Measurement of experimental die | | | |
|---|---|---|---|---|---|
| | | Measurer readjustment measurement reproducibility | | Sensor continuous measurement repeatability | |
| | Data | Average | Standard deviation | Average | Standard deviation |
| Experimental die step difference measurement position | Bottom Shim offset | 293 um | 2 um | 295 um | 0 um |
| | Bot-Mid Die Offset | 11 um | 2 um | 10 um | 0 um |
| | Top Shim Offset | 665 um | 12 um | 643 um | 1 um |
| | Mid-Top Die Offset | 5 um | 2 um | 6 um | 0 um |

TABLE 6

| | | Classification Measurement of verification specimen Measurer readjustment measurement reproducibility | |
|---|---|---|---|
| | Data | Average | Standard deviation |
| Target thickness of verification specimen | Specimen of 50 um | 50 um | 1 um |
| | Specimen of 100 um | 102 um | 0 um |
| | Specimen of 300 um | 300 um | 0 um |

It can be ascertained from Tables 2 to 6 that the apparatus for measuring a step difference according to the present specification may measure the step difference (offset) between the lip and the shim of the slot die, and the reproducibility and reliability of the measured numerical value are high.

The invention claimed is:

1. An apparatus for measuring a step difference of a slot die, the apparatus comprising:
a laser sensor configured to measure the step difference between a plurality of lips and an at least one shim of the slot die, wherein the slot die includes a plurality of bodies having the plurality of lips provided at one end thereof, wherein the at least one shim is provided between the plurality of bodies and is configured to discharge an ink, and wherein the laser sensor is disposed to face the plurality of lips and the at least one shim of the slot die; and
a jig configured to contact at least one of the plurality of bodies at a portion of the slot die from which the ink is discharged to maintain a distance between the plurality of lips and the laser sensor and to maintain a distance between the at least one shim and the laser sensor.

2. The apparatus of claim 1, further comprising:
a determination part configured to compare the step difference between the plurality of lips and the at least one shim with a reference value.

3. The apparatus of claim 2, wherein the determination part is configured to determine that the slot die is in a state requiring reassembly based on the step difference between the plurality of lips and the at least one shim exceeds the reference value.

4. The apparatus of claim 2, wherein the reference value is 300 μm.

5. The apparatus of claim 1, wherein the slot die comprises:
a first body having a first lip;
a second body having a second lip; and
a first shim provided between the first body and the second body, and
wherein the laser sensor is configured to measure a step difference between an end of the first lip and an end of the first shim.

6. The apparatus of claim 5, wherein the laser sensor is configured to measure a step difference between the end of the first lip and an end of the second lip.

7. The apparatus of claim 1, wherein the slot die comprises:
a first body having a first lip;
a second body having a second lip;
a third body having a third lip;

a first shim provided between the first body and the second body; and a second shim provided between the second body and the third body, and wherein the laser sensor is configured to measure a step difference between an end of the first lip and an end of the first shim and a step difference between an end of the second lip and an end of the second shim.

8. The apparatus of claim 7, wherein the laser sensor is configured to measure a step difference between the end of the first lip and the end of the second lip and a step difference between the end of the second lip and an end of the third lip.

9. The apparatus of claim 1, wherein a distance between the plurality of lips and the laser sensor is in a range of 17 mm to 23 mm.

10. The apparatus of claim 1, wherein the apparatus is a portable apparatus.

11. The apparatus of claim 1, wherein the at least one shim is recessed from the one end of the plurality of bodies having the plurality of lips.

* * * * *